May 29, 1934. H. JUNKERS Re. 19,184

FUEL INJECTION DEVICE FOR INTERNAL COMBUSTION ENGINES

Original Filed Jan. 14, 1932

Inventor:
Hugo Junkers
by Karl Lichtenberg
Atty.

Reissued May 29, 1934

Re. 19,184

UNITED STATES PATENT OFFICE 19,184

FUEL INJECTION DEVICE FOR INTERNAL COMBUSTION ENGINES

Hugo Junkers, Dessau, Germany

Original No. 1,901,814, dated March 14, 1933, Serial No. 586,592, January 14, 1932. Application for reissue November 25, 1933, Serial No. 699,762. In Germany January 17, 1931

11 Claims. (Cl. 299—107.6)

My invention relates to fuel injection devices for internal combustion engines, and more particularly to solid-injection fuel admitting devices of the type in which a needle is permanently applied under pressure to a seat in the casing of the injection device. It is an object of my invention to improve a fuel injection device of the type described with a view to preventing excessive pressure and deformation at the seat of the needle in the casing.

To this end, in combination with means such as a cap nut anchored on one of the members, for instance the casing, and exerting thrust on the other member, for instance the needle, I provide means for limiting the relative movement of the free ends of the two members under the action of the thrust.

In injection devices of the type described as heretofore designed in which the needle is permanently applied to a seating face at the inner end of the casing so as to make a tight fit thereon, the seating face is subjected to deformation if the needle is applied to the seat at excessive pressure. Deformation of the face is detrimental because it interferes with the tight fit of the needle on its seat, and because defective fit may cause irregularity of the issuing jet of fuel.

According to the present invention the pressure which the needle exerts on the seat in the casing, is limited in such manner that it will not overstep a certain predetermined limit even if the thrust exerted on the needle by the cap nut or the like should exceed this limit.

In reducing my invention to practice I may for instance provide a lug, preferably a collar, at or near the free end of the needle or on a member forming an extension of the needle, and an abutment for the lug or collar on the casing. The mating faces on the lug or collar and of the abutment are so arranged that in the unstressed condition of the needle they are spaced a definite distance. The clearance between the faces must be exactly equal to the relative displacement of the free ends of the needle and the casing under the tension which the means aforesaid, for instance the cap nut, exerts on the casing and the compression or upsetting it exerts on the needle when the needle has been applied to its seat in the casing under the predetermined pressure. By the resilient deformation of the needle and the casing the needle is applied to its seat, while at the same time the mating faces of the abutment on the casing and the lug or collar on the needle move toward each other and finally engage. At this moment the pressure under which the needle is applied to its seat, has attained the predetermined limit which is a function of the size and the elasticity coefficients of the needle and the casing. If the cap nut or other means is operated further, it will only increase the pressure at which the lug or collar on the needle and the abutment on the casing engage, but not the pressure which the needle exerts on its seating face. In other words, the predetermined seating pressure of the needle will never overstep its limit even if the cap nut or other means is operated after the limit has been attained. This operation only results in an increase of the pressure at which the mating faces engage, but never in overstressing and deformation of the seating faces of the needle and the casing, so that the tight fit of the faces is not interfered with.

It is another object of my invention to so design an injection device of the type referred to that the clearance between the lug or collar on the needle and the abutment on the casing in unstressed condition will not become unconveniently small. In injection devices of short overall length with correspondingly small deformations it is difficult to machine the lug or collar on the needle and the abutment on the casing to exactly the distance required.

For the purpose of eliminating this difficulty I artificially increase the resiliency of the casing or the needle or both, which may be effected by reducing the section of one or both members, or rendering them more resilient in some other way. For instance the casing or the needle may be equipped with any number of grooves in its outer and/or inner wall in a plane extending transversely to the needle axis.

In the drawing affixed to this specification and forming part thereof various types of injection devices embodying my invention are illustrated diagrammatically by way of example.

In the drawing

Figure 1:
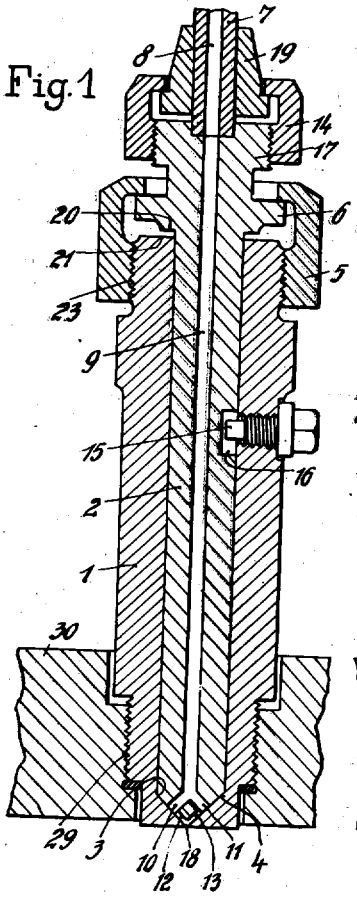
Fig. 1 is an axial section of an injection device of normal length in which the lug or collar on the needle is integral with the needle.
Figure 2:
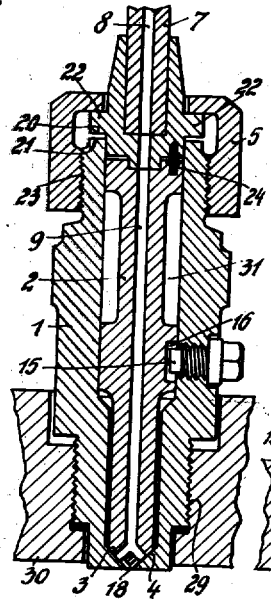
Fig. 2 is an axial section of a shorter injection device in which the section of the needle is reduced for a portion of its length in order to increase its resiliency, as and for the purpose specified, and the lug or collar is formed on a detachable extension of the needle.
Figure 3:
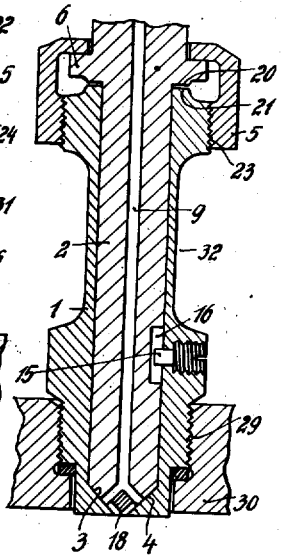
Figure 4:
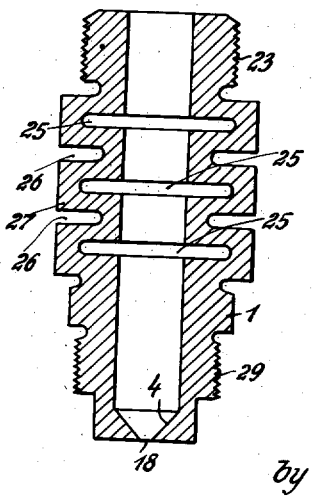

Fig. 3 is an axial section of an injection device having the same length as the injection device illustrated in Fig. 2, but in which the section of the casing is reduced for a portion of its length and the lug or collar is formed integral with the needle, as shown in Fig. 1, and Fig. 4 is an axial section of a casing having transverse grooves in its inner and outer perimeters for increasing its resiliency.

Referring now to the drawing, in all figures 30 is a portion of the cylinder head, 1 is the casing which is inserted in the cylinder head by a thread 29 near its lower end, 2 is the needle which is axially bored at 9, 10 and 11 are diverging fuel passages extending from the inner end of the bore 9, 3 is a tapered seating face at the inner end of the needle 2, and 4 is a corresponding face at the inner end of the casing 1. 12, 13 are fuel discharge grooves extending from the passages 10 and 11 to the ejection opening 18 at the centre of the casing. 23 is a thread at the outer end of the casing 2, 5 is a cap nut on the thread and 6 is a lug on the needle, here shown as a collar, which is engaged by the inwardly projecting flange of the cap nut so that by turning the cap nut thrust is exerted on the needle. 20 is the face at the needle for limiting the relative displacement of the needle and the casing, as and for the purpose specified, and 21 is the abutment at the outer end of the casing. 7 is a fuel supply pipe with its bore 8 in line with the bore 9 of the needle, 19 is a plug surrounding the end of the pipe 7, and 14 is a cap nut on the threaded upper end 17 of the needle, with its flange engaging a shoulder on the plug 19 for holding the pipe 7 on the needle 2.

Turning of the needle 2 in the casing 1 is prevented by a check 15 on the casing 1 engaging in a slot 16 of the needle 2.

The fuel supplied through pipe 7 is delivered to the bore 9 and the diverging passages 10 and 11, two or more of which may be provided. These passages open into the tapered seating face 3 of the needle which is applied to the seating face 4 of the casing 1 by the cap nut 6, and the fuel is conducted to the ejection opening 18 through the fine grooves 12, 13 which are formed in the seating face 3 of the needle.

In the example illustrated in Fig. 1 the overall length of the injection device is such that means for artificially increasing the resiliency of the needle and/or the casing are not required. The casing and the needle therefore are substantially plain cylinders, the needle fitting a cylindrical bore in the casing. In the unstressed condition of the needle and the casing illustrated in Fig. 1 a clearance which is shown at an exaggerated scale, is present between the face 20 of the needle and the abutment 21 of the casing. When the nut 5 is turned on its thread 23 the casing 1 is under tension and the needle 2 is under compression and the two members are resiliently deformed, the casing being stretched and the needle upset, until the faces 20 and 21 engage. At this moment the force which applies the seat 3 of the needle 1 to the seat 4 in the casing 2, has the predetermined amount which must not be exceeded. If by inadvertence the nut 5 is turned further it will only increase the pressure at which the faces 20 and 21 engage but not the pressure on the seating faces. Consequently the pressure at the seating faces 3, 4 cannot be increased beyond the predetermined limit.

Figs. 2 and 3 illustrate injection devices of shorter overall length in which it would be difficult to provide a clearance between the faces 20, 21 of exactly the size required, for the reasons stated. In order to obtain a larger clearance the section of the needle 2 is reduced at 31, so that it becomes more resilient and the amount to which it is upset by a given force, is increased in proportion, as compared with a needle of uniform section.

In the example illustrated in Fig. 2 the lug or collar 6 at the needle and the plug 19 at the end of the supply pipe 7 are combined into a separate detachable member 22 which is placed on the needle as an axial extension, and held against turning by a pin 24. This has the advantage that the flange member may be exchanged if required, without involving the needle.

Referring now to Fig. 3, the flange 6 is integral with the needle 2 as illustrated in Fig. 1 but in order to obtain the resiliency required for the exact sizing of the clearance between 20 and 21, the section of the casing 2 is reduced at 32.

Fig. 4 illustrates another solution of the problem of increasing the resiliency of comparatively short members. Here the casing 1 has three grooves 25 in its inner, and two grooves 26 in its outer wall, the plane of the grooves extending at right angles to the axis of the casing. Full sections 27 extend between each outer and inner groove, and the casing resembles a cylindrical diaphragm such as used in aneroid barometers.

Obviously the several details illustrated are not limited to the particular type of injection device in which they have been shown.

Thus, the detachable member 22 might also be adapted to the injection devices illustrated in Figs. 1 and 3 instead of the fixed collar 6, the section of the casing in the injection device illustrated in Fig. 2, or the section of the needle in the injection device illustrated in Fig. 3 might be reduced so that the resiliency of both the needle and the casing are artificially increased. The diaphragm-like design of the casing 1 illustrated in Fig. 4 might also be adapted to the needle 2.

I wish it to be understood that I do not desire to be limited to the exact details of construction shown and described for obvious modifications will occur to a person skilled in the art.

I claim:—

1. A solid-injection fuel admitting device for internal combustion engines comprising a casing, a needle with a fuel passage inserted in said casing, co-acting seating faces on said needle and said casing, means anchored on one of said members for exerting thrust on the other member so as to apply their seating faces onto each other, and means for limiting the relative movement of the free ends of said members under the action of the thrust.

2. A solid-injection fuel admitting device for internal combustion engines comprising a casing, a needle with a fuel passage inserted in said casing, coacting seating faces on said needle and said casing, a lug on one of said members, and an abutment on the other member adapted to be engaged by said lug, said lug and said abutment being so arranged that the clearance between them in unstressed condition of the two members is equal to the distance through which the free ends of said members are displaced with respect to each other when said seating faces are applied to each other at a predetermined pressure.

3. A solid-injection fuel admitting device for internal combustion engines comprising a casing, a needle with a fuel passage inserted in said casing, coacting seating faces on said needle and said casing, means anchored on one of said members for exerting thrust on the other member so as to apply their seating faces onto each other, means for limiting the relative movement of the free ends of said members under the action of the thrust, and means for increasing the resiliency of one of said members.

4. A solid-injection fuel admitting device for internal combustion engines comprising a casing having a partly reduced section, a needle with a fuel passage inserted in said casing, coacting seating faces on said needle and said casing, means anchored on one of said members for exerting thrust on the other member so as to apply their seating faces onto each other, and means for limiting the relative movement of the free ends of said members under the action of the thrust.

5. A solid-injection fuel admitting device for internal combustion engines comprising a casing, a needle with a fuel passage inserted in said casing having a partly reduced section, coacting seating faces on said needle and said casing, means anchored on one of said members for exerting thrust on the other member so as to apply their seating faces onto each other, and means for limiting the relative movement of the free ends of said members under the action of the thrust.

6. A solid-injection fuel admitting device for internal combustion engines comprising a casing, a needle with a fuel passage inserted in said casing, coacting seating faces on said needle and said casing, means anchored on one of said members for exerting thrust on the other member so as to apply their seating faces onto each other, and means for limiting the relative movement of the free ends of said members under the action of the thrust, one of said members being designed like a cylindrical diaphragm.

7. A solid-injection fuel admitting device for internal combustion engines comprising a casing, a needle with a fuel passage inserted in said casing, coacting seating faces on said needle and said casing, means anchored on one of said members for exerting thrust on the other member so as to apply their seating faces onto each other, and means for limiting the relative movement of the free ends of said members under the action of the thrust, one of said members having grooves extending transversely to its axis.

8. A solid-injection fuel admitting device for internal combustion engines comprising a casing, a needle with a fuel passage inserted in said casing, coacting seating faces on said needle and said casing, means anchored on said casing for exerting thrust on said needle and said casing so as to apply said seating faces to each other, and means for limiting the relative movement of the free ends of said casing and said needle under the action of the thrust.

9. A solid-injection fuel admitting device for internal combustion engines comprising a casing, a needle with a fuel passage inserted in said casing, coacting seating faces on said needle and said casing, means anchored on said casing for exerting thrust on said needle and said casing so as to apply said seating faces to each other, a lug on said needle and an abutment on said casing adapted to be engaged by said lug, the clearance between said lug and said abutment being so determined that the pressure at said seating faces is limited to a predetermined amount.

10. A solid-injection fuel admitting device for internal combustion engines comprising a casing, a needle with a fuel passage inserted in said casing, coacting seating faces on said needle and said casing, means anchored on said casing for exerting thrust on said needle and said casing so as to apply said seating faces to each other, a detachable member forming an axial extension of said needle, a lug on said extension, and an abutment on said casing adapted to be engaged by said lug, the clearance between said lug and said abutment being so determined that the pressure at said seating faces is limited to a predetermined amount.

11. A solid-injection fuel admitting device for internal combustion engines comprising a casing, a needle inserted in said casing, means for supplying fuel to the casing extending in the axial direction of said casing, coacting seating faces on said needle and said casing, a collar on said needle facing the end face of said casing and means anchored on one of said members for exerting thrust on the other member so as to apply their coacting seating faces onto each other and said collar onto the end face of said casing.

HUGO JUNKERS.